US008203431B2

(12) United States Patent
Graeber

(10) Patent No.: US 8,203,431 B2
(45) Date of Patent: Jun. 19, 2012

(54) METHOD OF PROCESSING DATA, ELECTRONIC DEVICE AND TRANSPONDER

(75) Inventor: Frank Graeber, Seestermuehe (DE)

(73) Assignee: NXP B.V., Eindhoven (NL)

( * ) Notice: Subject to any disclaimer, the term of this patent is extended or adjusted under 35 U.S.C. 154(b) by 358 days.

(21) Appl. No.: 12/525,228

(22) PCT Filed: Feb. 12, 2008

(86) PCT No.: PCT/IB2008/050497
§ 371 (c)(1),
(2), (4) Date: Jul. 30, 2009

(87) PCT Pub. No.: WO2008/099335
PCT Pub. Date: Aug. 21, 2008

(65) Prior Publication Data
US 2010/0026464 A1     Feb. 4, 2010

(30) Foreign Application Priority Data
Feb. 14, 2007  (EP) .................................. 07003105

(51) Int. Cl.
*H04Q 5/22*  (2006.01)
(52) U.S. Cl. ............. 340/10.1; 340/10.3; 340/10.4; 340/10.41; 340/572.1; 340/539.1; 713/178; 713/179; 713/193
(58) Field of Classification Search ............ 340/10.1, 340/10.3, 10.4, 10.41, 572.1–572.7, 539.1, 340/539.22; 713/179, 193, 178; 701/213, 701/517
See application file for complete search history.

(56) References Cited

U.S. PATENT DOCUMENTS

| | | | |
|---|---|---|---|
| 6,144,916 A | 11/2000 | Wood, Jr. et al. | |
| 6,496,775 B2 * | 12/2002 | McDonald et al. | ............ 701/213 |
| 2005/0247775 A1 | 11/2005 | Gloekler et al. | |
| 2006/0017545 A1 | 1/2006 | Volpi et al. | |
| 2006/0052055 A1 | 3/2006 | Rowse et al. | |
| 2006/0244568 A1 | 11/2006 | Tong et al. | |

FOREIGN PATENT DOCUMENTS

| | | | |
|---|---|---|---|
| EP | 1282263 A | | 2/2003 |
| EP | 1480174 A1 | | 11/2004 |
| WO | 2005069203 A | | 7/2005 |
| WO | 2006027723 A1 | | 3/2006 |
| WO | 2006031824 A1 | | 3/2006 |

* cited by examiner

*Primary Examiner* — George Bugg
*Assistant Examiner* — Sisay Yacob

(57) ABSTRACT

In a method of processing data, an RFID signal (6) sent by a reader (3,5) via a field generated by the reader (3,5) is received at a passive RFID transponder (2). The transponder (2) comprises a dedicated receiver (28) for receiving a time signal (8), which is wirelessly sent By an external sender (4) and comprises information about the present time. The transponder (2) including the dedicated receiver (28) is powered utilizing the field such that the dedicated receiver (28) detects the time signal (8) and decodes the present time. Utilizing the transponder (2), the first data (7) contained in the RFID signal (6) is decoded and processed. Second data (9) which are time stamped by said transponder (2) utilizing said present time are generated, and a response signal (10) comprising the second data (9) is transmitted from the transponder.

20 Claims, 3 Drawing Sheets

METHOD OF PROCESSING DATA, ELECTRONIC DEVICE AND TRANSPONDER

FIELD OF THE INVENTION

The invention relates to a method of processing data, to an electronic device, and to a transponder.

BACKGROUND OF THE INVENTION

RFID transponders, which are also referred to as tags or labels, are well known in the art and are designed to wirelessly communicate with a reader device, which is also known as a base station. Usually, the transponder comprises an electronic circuit, for instance, an integrated circuit and an antenna to capture signals sent by the reader device. Then, the electronic circuit processes the signals captured by the antenna and may generate a response signal for the reader device.

European application for patent No. 1 480 174 A1 discloses a method for making available a reliable time on a SIM card of a cellular handset. The SIM card is connected via contacts to and is powered by the handset and comprises an internal timer for providing real time functionality. When the handset is turned on, the SIM card receives a reference time issued by a reliable time source, typically a distant server, in order to initialize the internal timer of the SIM card.

OBJECT AND SUMMARY OF THE INVENTION

It is an object of the present invention to provide an electronic device for a passive RFID transponder and a passive RFID transponder, which provide a trusted timestamp to data transmitted by the transponder in response to a signal sent by a reader.

It is a further object of the present invention to provide a method of processing data utilizing a passive RFID transponder, wherein the method provides a trusted timestamp to data transmitted by the transponder in response to data sent by a reader.

The object of the invention is achieved by means of an electronic device for a passive RFID transponder, comprising:

a dedicated receiver for wirelessly receiving a time signal sent by an external sender, wherein the time signal comprises an information about the present time;

an RFID interface to receive an RFID signal sent by a reader via a field generated by the reader; and a processing device to process first data contained in the RFID signal and to generate a response signal, which comprises second data and is to be sent utilizing the RFID interface, wherein the processing device is configured to timestamp the second data utilizing the present time of the time signal when generating the response signal and the electronic device is powered by the field.

The object is also achieved in accordance with the invention by means of a passive RFID transponder comprising the inventive electronic device and an antenna connected to the RFID interface.

The inventive electronic device, which may particularly be an integrated circuit, comprises the dedicated receiver for wirelessly receiving the time signal. The time signal comprises information about the present time.

In order to have the present time relatively accurate, the dedicated receiver may especially form a so-called radio clock. A radio clock is a clock that is synchronized by a time code transmitted by a radio transmitter connected to a standard time such as an atomic clock. Radio clocks depend on time signal radio stations, i.e. on the external sender operating independently from the reader.

Normally, the broadcast frequency of a radio stations is based on a so-called frequency standard. Radio stations moreover may broadcast so called "pips" to identify the start of a present second interval, may broadcast time codes for identifying second intervals, and/or may publish a relative exact geographic location of each antenna of the external sender so that the time propagation of the time signal can be estimated at the inventive electronic device or transponder, respectively.

Additionally, a variety of frequencies may help receiving the time signal independently from the ionospheric weather.

There are many different standards to receive information about the present time utilizing the timing signal. Depending on the standard used, the accuracy of the present time may differ. Examples of such standards include, without limitation, terrestrial time signals, such as DCF77, GPS clocks, FM radio data systems (RDS), digital radio mondial (DRM), Zig-Bee, and WiMAX (Worldwide Interoperability for Microwave Access).

As a result, the inventive electronic device or the transponder do not need any internal timer requiring an active power source, such as a battery, in order to have the present time available to timestamp the second data contained in the response signal.

The inventive transponder is a passive transponder and, thus, does not necessarily have an active power source, such as a battery. When receiving the RFID signal sent by the reader, it is powered by the field emitted by the reader, which field also carries the RFID signal. Then, the transponder can decode the RFID signal in order to obtain and process the first data and generate the second data, Moreover, the dedicated receiver is powered and thus can make the present time available to timestamp the second data to be sent. Thus, even though the inventive transponder is a passive transponder and does not comprise an internal timer, it is capable of timestamping data when necessary. An internal timer would require an internal active power source, such as a battery. The inventive electronic device, however, does not rely on such an active power source. Nevertheless, reliably time-stamping the second data is possible.

The present time may be decoded from the time signal. Then, the inventive electronic device may comprise an appropriate decoding device.

In order to allow a secure transmission of the response signal, the electronic device may comprise a memory, in which a key for encrypting the second data is stored. The electronic device may also comprise a cryptographic device for electronically signing the second data.

In one embodiment of the inventive electronic device or the transponder, the processing device timestamps the first data utilizing the present time, and the second data include the first data being time stamped. Additionally, the second data may include specific information of the transponder, such as its UID, a position code, etc. The UID identifying the transponder, the second data, and/or an identification of the transponder may be electronically signed.

The inventive transponder may be embedded into a so-called smart poster. A smart poster is a poster, for instance used as an advertising poster, including a transponder. Usually, a smart poster has a fixed location, and neither includes a power source nor is connected to any other system components, for instance via cables or wirelessly. If the smart poster comprises the inventive transponder, then the transponder may include personalized data which are, for instance, location specific. Since it is powered by the reader when needed, it does not need an active power source.

The object of the invention is also achieved by a method of processing data, comprising the steps of:

receiving at a passive RFID transponder an RFID signal sent by a reader via a field generated by the reader, wherein the transponder comprises a dedicated receiver for receiving a time signal, which is wirelessly sent by an external sender and comprises an information about the present time;

powering the transponder including the dedicated receiver utilizing the field such that the dedicated receiver detects the time signal and decodes the present time;

decoding the RFID signal and processing first data contained in the RFID signal utilizing the transponder;

generating second data which are time-stamped by the transponder utilizing the present time; and transmitting a response signal comprising the second data to the reader.

For carrying out the inventive method, the inventive transponder can be used.

If the transponder is within the radio range of the reader, the transponder receives the field emitted by the reader. The field may be an electric, an electromagnetic, or a magnetic field and powers the transponder including its dedicated receiver. Then, the transponder can decode the RFID signal and process the first data. The receiver moreover decodes the present time from the time signal. Therefore, the transponder has the present time available as soon as it is within the radio range of the reader. Therefore, no internal clock is required which would need an internal active power source, such as a battery. Consequently, the inventive method and the inventive transponder provide enhanced flexibility and reduce costs, because they do not need an active power source, such as a battery. Additionally, especially when using a radio clock as the dedicated receiver, a relative accurate present time is available at the transponder. This allows a relative reliable time-stamping of the second data.

In some applications, it may be necessary to send data from the reader, i.e. the first data to be reliably time-stamped. Therefore, one example of the inventive method comprises the step of times-tamping the first data when receiving the RFID signal utilizing the present time and generating the second data, which comprise the first data being time stamped. The second data may also comprise information being specific for the transponder, such as its UID or a position where the transponder is located.

For a secure transmission of the second data, they may be cryptographically signed utilizing an electronic signature. This may be accomplished by utilizing a key stored in the transponder.

The reader may particularly be incorporated into a mobile device, such as a mobile telephone. Then, the inventive method may comprise the step of transmitting the response signal to the reader being incorporated into the mobile device. When receiving the second signal, the reader may verify the electronic signature.

The incorporation of the reader into the mobile device can be accomplished, for instance, by providing a Near Field Communication (NFC) interface for the mobile device. Thus, a mobile device including an NFC interface is regarded as a mobile device comprising reader functionality in this context.

The transponder may be incorporated into a poster, which is then referred to as a smart poster.

BRIEF DESCRIPTION OF THE DRAWINGS

The invention will be described in detail hereinafter, by way of non-limiting examples, with reference to the embodiments shown in the drawings.

DESCRIPTION OF EMBODIMENTS

Figure 1:
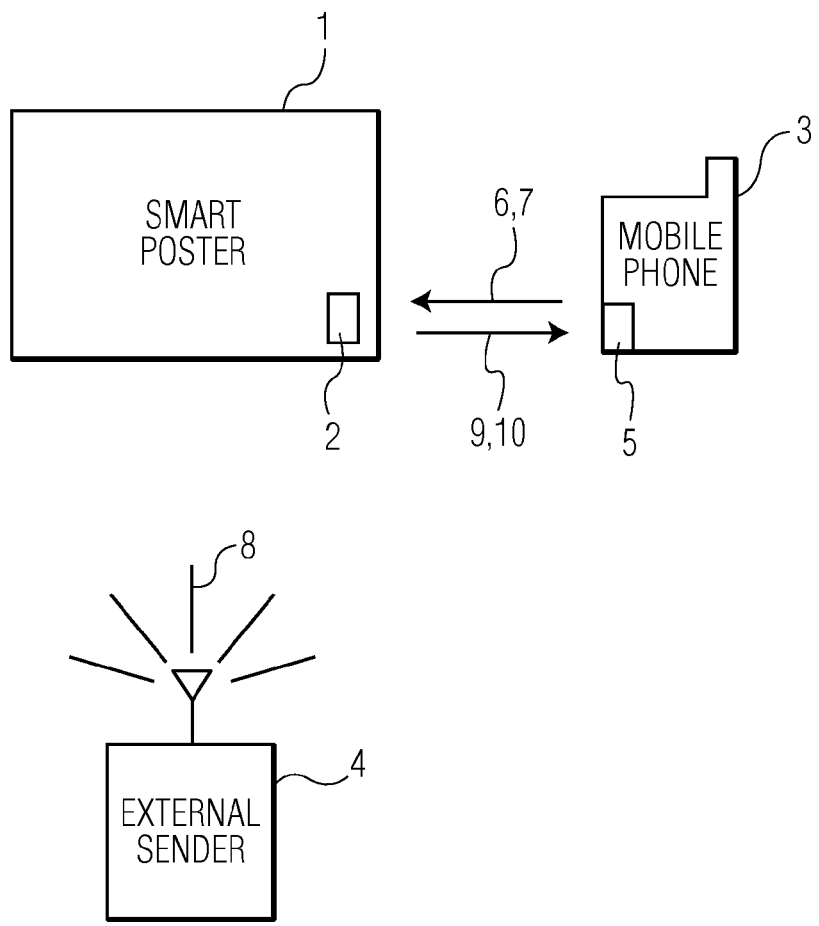
FIG. 1 is a mobile phone communicating with an RFID transponder of a smart poster.
Figure 2:
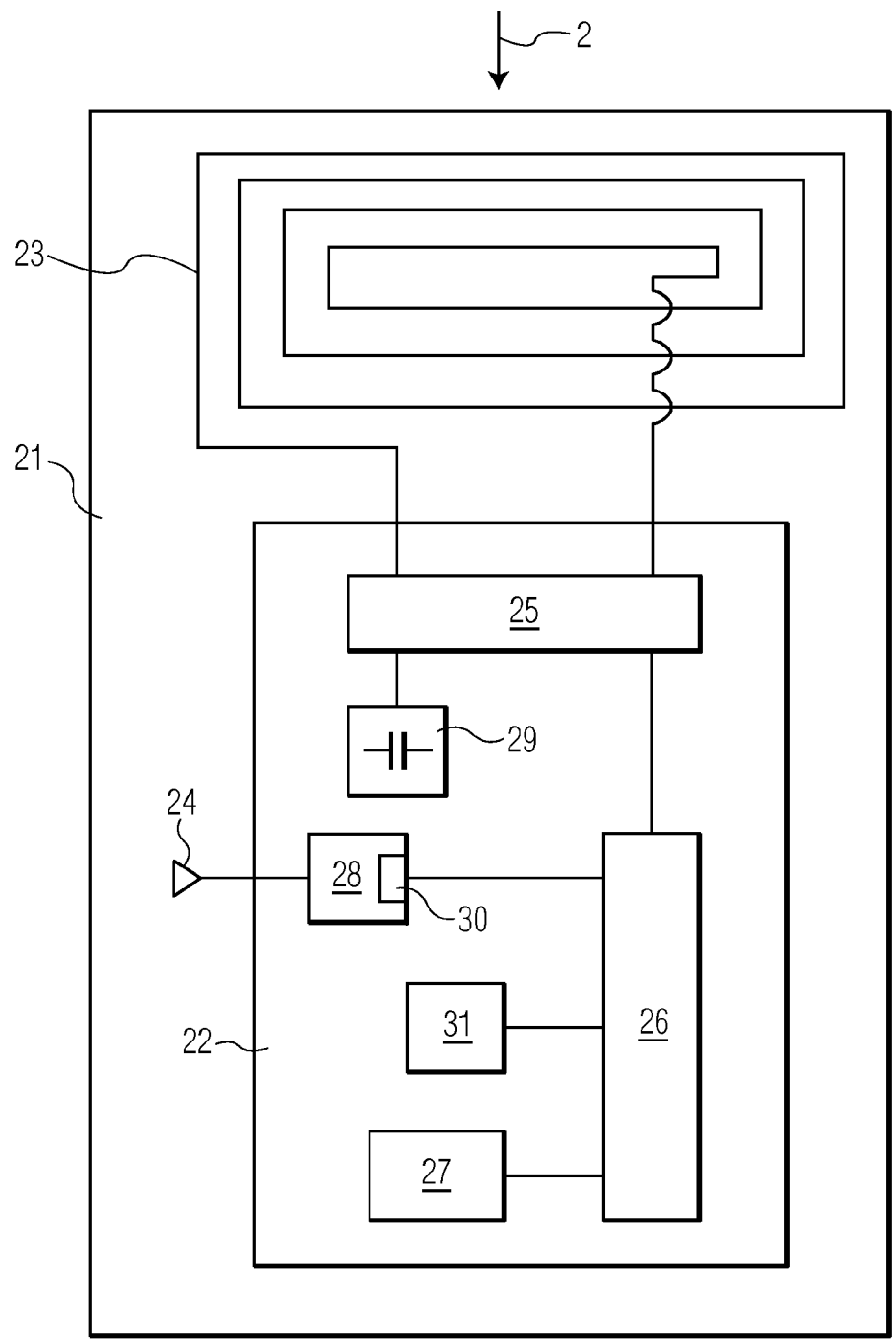
FIG. 2 is the RFID transponder of FIG. 1.
Figure 3:
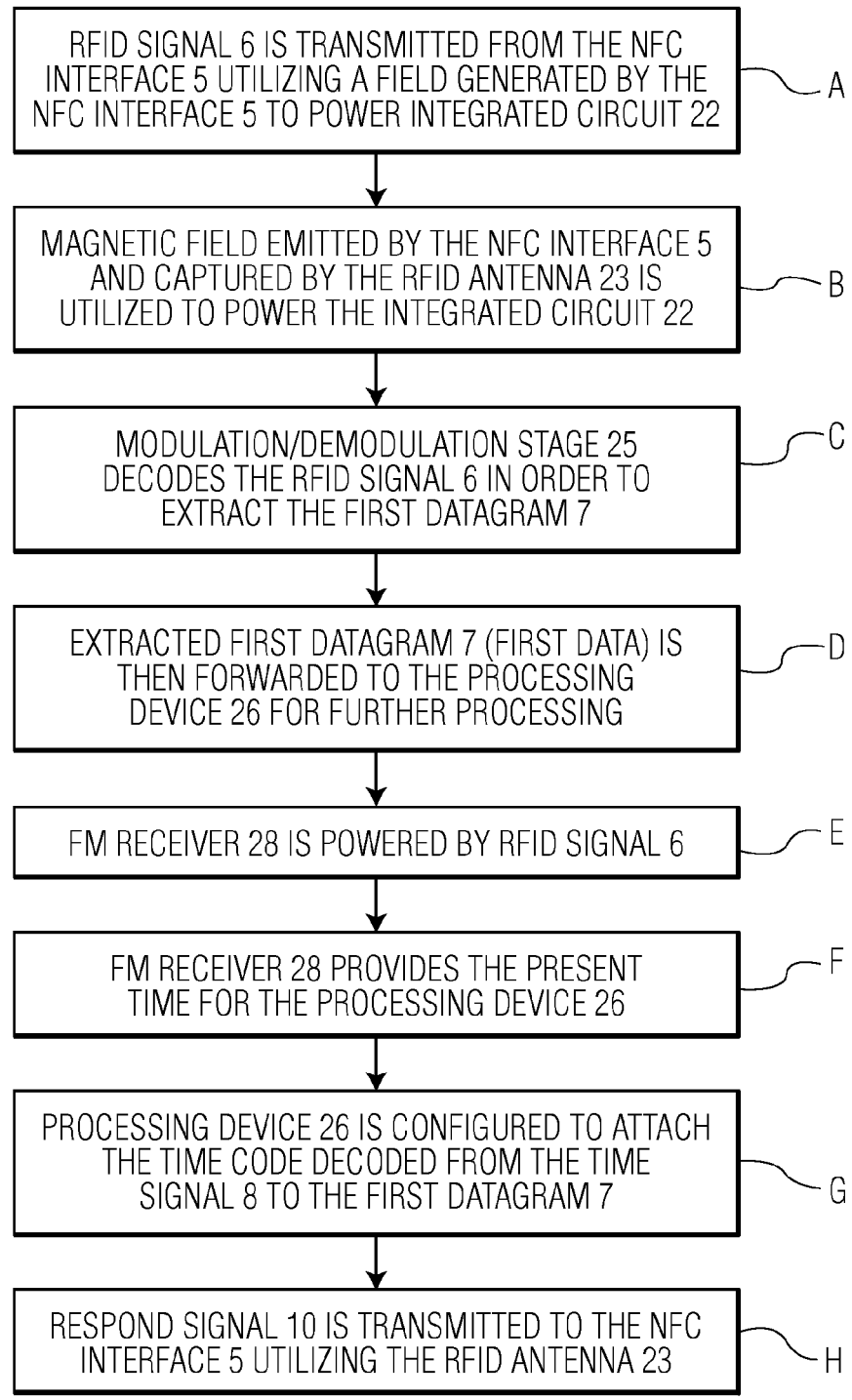
FIG. 3 is a flow chart illustrating the communication between the mobile phone and the RFID transponder.

FIG. 1 shows a smart poster 1, a mobile phone 3 as an example of a mobile device, and an external sender 4. The smart poster 1 comprises a transponder 2 and the mobile phone 3 comprises an NFC (Near Field Communication) interface 5 and is configured to communicate with the transponder 2. The transponder 2 is depicted in more detail in FIG. 2, and FIG. 3 illustrates the communication between the transponder 2 and the mobile phone 3.

Due to its NFC interface 5, the mobile phone 3 can basically function as an RFID reader.

The transponder 2 comprises a substrate 21, an integrated circuit 22 (as an example of the inventive electronic device) attached to the substrate 21, and RFID and FM antennas 23, 24, each attached to the substrate 21 and connected to the integrated circuit 22. The integrated circuit 22 comprises a modulation/demodulation stage 25 connected to the RFID antenna 23, a processing device 26 connected to the modulation/demodulation stage 25, a memory 27 connected to the processing device 26, an FM receiver 28 (with a decoding device 30) connected to the FM antenna 24 and the processing device 26, and an optional storage capacitor 29.

The RFID antenna 23 is configured to capture an RFID signal sent, for instance, by the mobile phone 3. Thus, if the mobile phone 3 is brought relatively close to the smart poster 1 and particularly relatively close to the transponder 2, then a person not explicitly shown in the figures and carrying the mobile phone 3 can activate the NFC interface 5 to transmit an RFID signal 6. The RFID signal 6 is transmitted from the NFC interface 5 utilizing a field generated by the NFC interface 5 (step A in the flow chart of FIG. 3).

In this embodiment, the field is a magnetic field. The magnetic field emitted by the NFC interface 5 and thus the RFID signal 6 is captured by the RFID antenna 23. The transponder 2 is a passive transponder and thus does not include an active power source, such as a battery. In order to power the integrated circuit 22, the magnetic field emitted by the NFC interface 5 and captured by the RFID antenna 23 is utilized to power the integrated circuit 22 (step B of the flow chart). For the exemplary embodiment, the magnetic field emitted by the NFC interface 5 charges the storage capacitor 29, which helps to supply the integrated circuit 22 with relatively constant power.

The RFID signal 6 comprises first data which are a first datagram 7 stored in the mobile phone 3 in this embodiment. The RFID antenna 23 captures the RFID signal 6 and the modulation/demodulation stage 25 decodes the RFID signal 6 in order to extract the first data, i.e. the first datagram 7 (step C of the flow chart).

The extracted first datagram 7 (first data) is then forwarded to the processing device 26 for further processing (step D of the flow chart).

As soon as the integrated circuit 22 is powered by the magnetic RFID field, also the FM receiver 28 is powered (step E of the flow chart).

The FM receiver 28 is connected to the FM antenna 24 and is configured to receive a time signal 8 emitted by the external sender 4. In this embodiment, the external sender 4 sends the time signal 8 in the so-called RDS (radio data system) standard which is known as Radio Broadcast Data System in the U.S.A. The time signal 8 comprises information about the present time.

The FM antenna 24 is configured to capture the time signal 8 and the FM receiver 28 of the transponder 2 comprises a decoding device 30. As soon as the FM receiver 28 is powered by the charged storage capacitor 29, the FM receiver 28 detects the timing signal 8 and its decoding device 30 decodes the timing signal 8 captured by the FM antenna 24 to a binary data format (time code). As a result, the FM receiver 28 provides the present time for the processing device 26 (step F of the flow chart). Thus, the FM receiver 28 forms a radio clock.

For the exemplary embodiment, the integrated circuit 22 comprises the memory 27, which memory 27 is a non-volatile memory, such as a ROM, EEPROM, or flash memory, and comprises a secret key and further information specific to the transponder 2. Information specific to the transponder 2 may be its UID or a position code associated with the position of the smart poster 1.

Therefore, as soon as the transponder 2 is within the radio range of the mobile phone 3 (emitting a radio field utilizing the NFC interface 5), the processing device 26 is provided with the present time from the FM receiver 28 and with the first datagram 7 (first data) from the mobile phone 3.

In this embodiment, the processing device 26 is configured to attach the time code decoded from the time signal 8 to the first datagram 7 (first data) as soon as the first datagram 7 is available at the processing device 26 (step G of the flow chart). Additionally, the processing device 26 extends the first datagram 7 by further transponder 2 specific information, such as the position code and the UID stored in the memory 27. Thus, the processing device 26 generates a second datagram 9 (second data) by timestamping the first datagram 7 and extending it by the UID and the position code.

In an advantageous embodiment, the integrated circuit 22 further comprises a cryptographic co-processor 31 which signs the second datagram 9 with an electronic signature utilizing the secret key stored in the memory 27. Then, the signed second datagram 9 is transformed into a respond signal 10 by the modulation/demodulation stage 25, which respond signal 10 is transmitted to the NFC interface 5 utilizing the RFID antenna 23 (step H of the flow chart).

The mobile phone 3 receives the response signal 10, decodes the second datagram 9 from the response signal 10 and verifies the electronic signature.

In the present embodiment, the mobile phone 3 is used for mobile ticketing. The first datagram 7 is an electronic ticket, for instance, for a public transportation system. When entering the public transportation system, for instance a bus, a streetcar, a subway, or a commuter train, the person carrying the mobile phone 3 transmits the first datagram 7 to the transponder 2 which basically timestamps the first datagram 7 and returns the timestamped first datagram 7 (second datagram 9) to the mobile phone 3. During the whole process, the transponder 2 is powered by the RFID field emitted by the NFC interface 5 of the mobile phone 3.

There are many different standards to receive an information about the present time utilizing the timing signal 8. Depending on the used standard, the accuracy of the present time may differ. Further examples of such standards include, without limitation, terrestrial time signals, such as DCF77, GPS clocks digital radio mondial (DRM), ZigBee, or WiMAX (Worldwide Interoperability for Microwave Access).

It should be noted that the steps B, C, and D can be performed at the same time as steps E and F are performed. Hence, steps B, C, D and E, F can form parallel branches followed by steps G, F.

Finally, it should be noted that the aforementioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. An electronic device for a passive Radio Frequency IDentification (RFID) transponder, comprising:
    a dedicated receiver configured to wirelessly receive a time signal sent by an external sender, wherein said time signal comprises information about a present time;
    an RFID interface configured to receive an RFID signal sent by a RFID reader via a magnetic field generated by said RFID reader; and
    a processing device configured to process said RFID signal, to generate a response signal that is to be sent utilizing said RFID interface, and to timestamp said response signal utilizing the present time of said time signal when generating said response signal, wherein only said generated magnetic field powers the electronic device.

2. The electronic device of claim 1, further comprising:
    a decoding device configured to decode said time signal in order to extract the present time from said time signal.

3. The electronic device of claim 1, wherein said processing device timestamps said RFID signal utilizing said present time.

4. A passive RFID transponder comprising said electronic device according to claim 1 and at least one antenna connected to said RFID interface.

5. A method of processing data, comprising:
    receiving, at a passive Radio Frequency IDentification (RFID) transponder, an RFID signal sent by a RFID reader, via a magnetic field generated by said RFID reader; said passive RFID transponder comprising a dedicated receiver for receiving a time signal, which is wirelessly sent by an external sender and comprises information about a present time;
    powering said passive RFID transponder, including said dedicated receiver, only utilizing said generated magnetic field such that said dedicated receiver detects said time signal and decodes said present time;
    decoding said RFID signal and processing said RFID signal utilizing said passive RFID transponder;
    timestamping, with said transponder, a response signal utilizing said present time; and
    transmitting the response signal to said RFID reader.

6. The method of claim 5, further comprising:
    timestamping the received RFID signal utilizing said present time; and
    generating said response signal from the timestamped RFID signal.

7. The method of claim 5, further comprising:
cryptographically signing said response signal utilizing an electronic signature.

8. The method of claim 5, wherein said RFID reader is incorporated into a mobile device.

9. The method of claim 7, further comprising:
receiving said response signal at said RFID reader; and
verifying said electronic signature.

10. The electronic device of claim 1, wherein the electronic device is a smart poster.

11. The electronic device of claim 1, wherein the RFID reader is a mobile phone.

12. The passive RFID transponder of claim 4, wherein the at least one antenna comprises a RFID antenna and a Frequency Modulation (FM) antenna.

13. The electronic device of claim 1, further comprising:
a storage capacitor.

14. The electronic device of claim 13, wherein the generated magnetic field charges the storage capacitor.

15. The method of claim 5, further comprising:
charging a storage capacitor with the generated magnetic field.

16. The method of claim 15, further comprising:
using the charged storage capacitor to power a Frequency Modulation (FM) receiver.

17. The method of claim 16, further comprising:
using the FM receiver to detect the time signal.

18. The method of claim 16, wherein the FM receiver forms a radio clock.

19. The method of claim 5, wherein a Frequency Modulation (FM) receiver provides the present time and a mobile phone provides the RFID signal.

20. The method of claim 7, wherein a mobile phone verifies the electronic signature.

\* \* \* \* \*